E. H. GUYER.
REGISTERING MECHANISM.
APPLICATION FILED FEB. 11, 1909. RENEWED APR. 2, 1915.
1,160,281.
Patented Nov. 16, 1915.
3 SHEETS—SHEET 1.
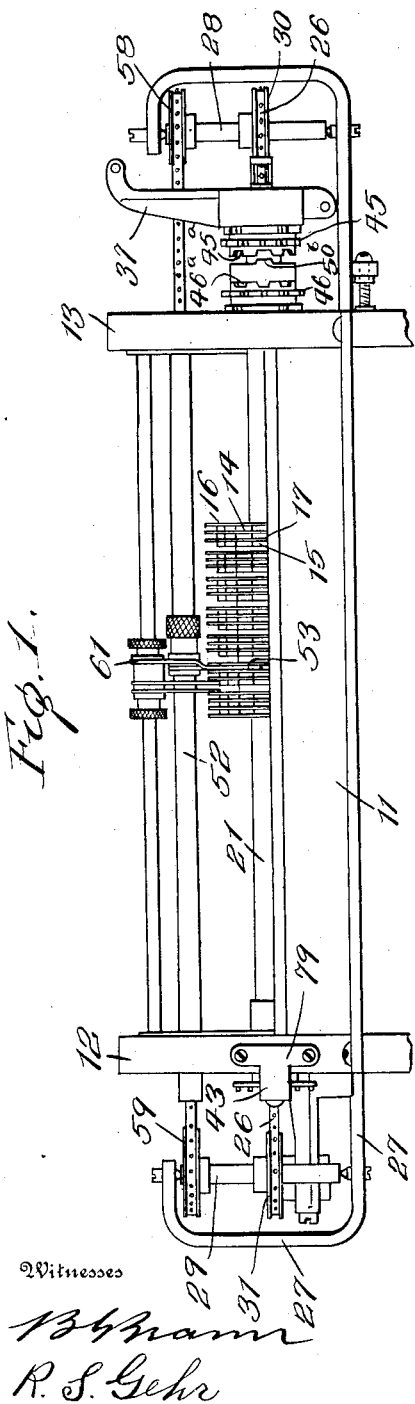
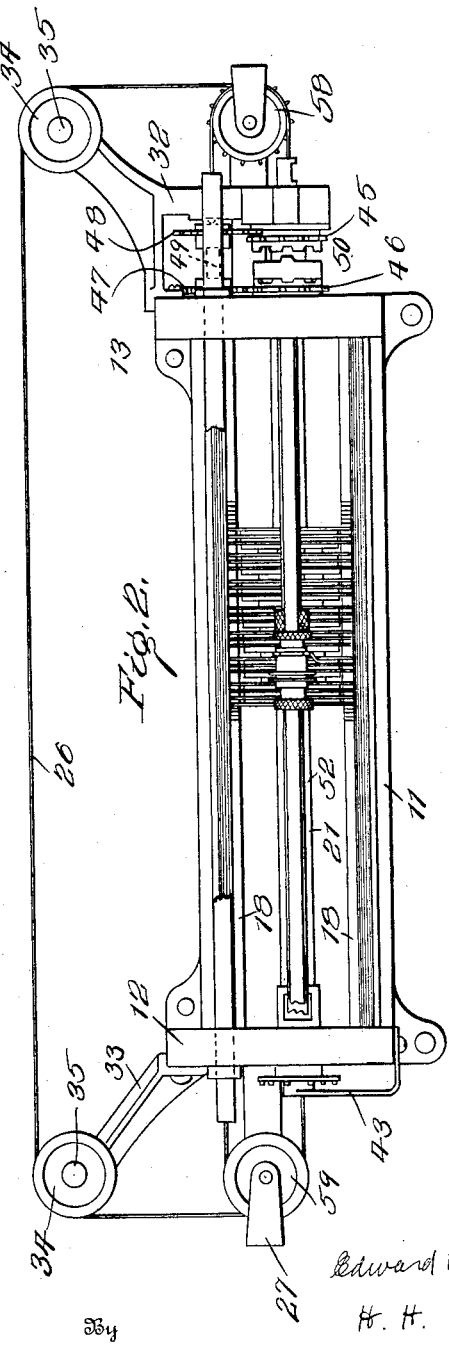
Witnesses
Inventor
Edward H. Guyer
H. H. Bliss
By
Attorney

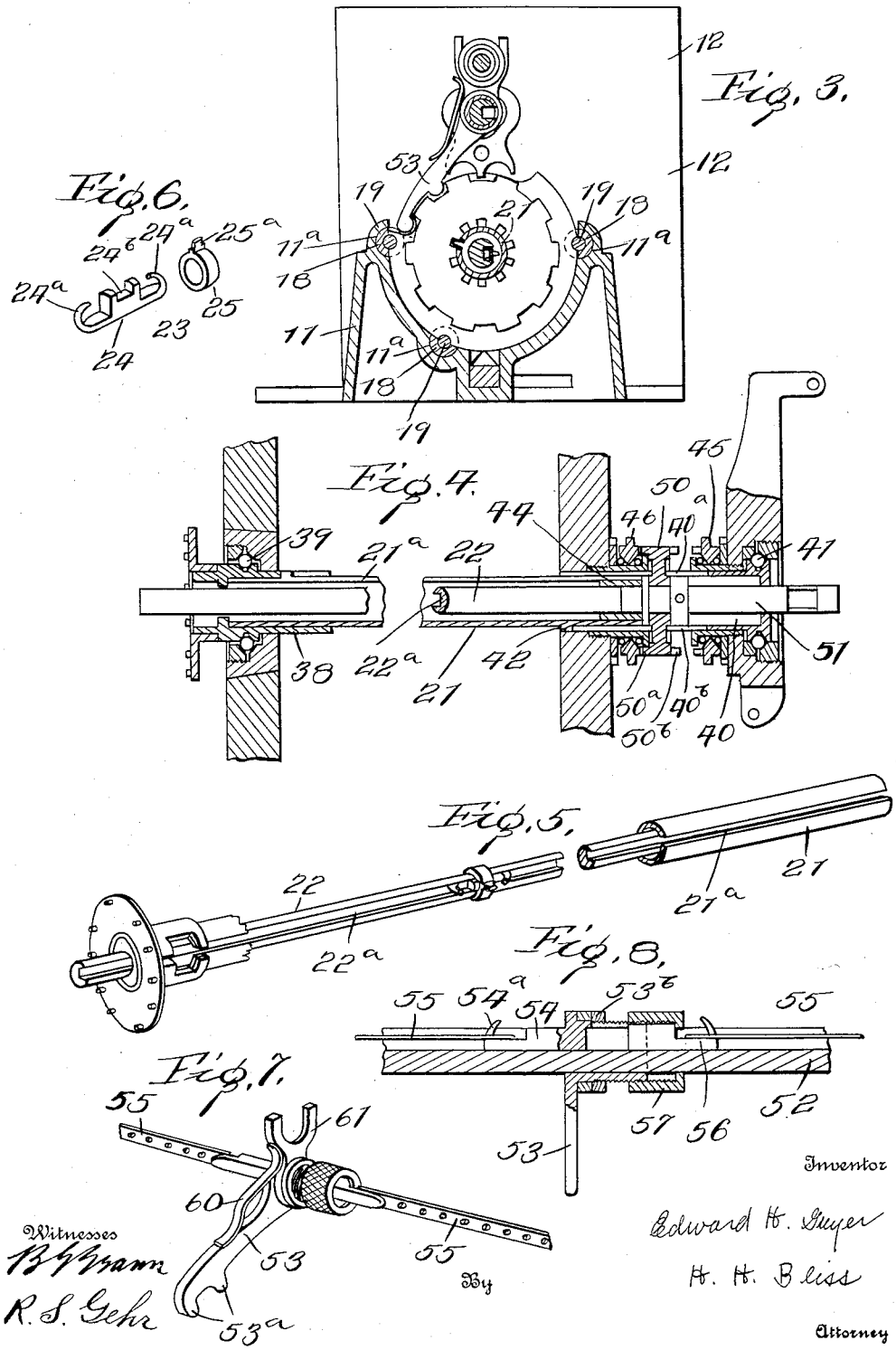

E. H. GUYER.
REGISTERING MECHANISM.
APPLICATION FILED FEB. 11, 1909. RENEWED APR. 2, 1915.
1,160,281.
Patented Nov. 16, 1915.
3 SHEETS—SHEET 3.
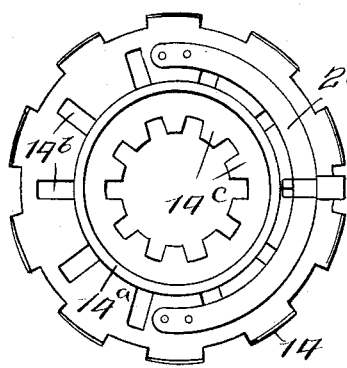
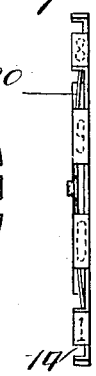
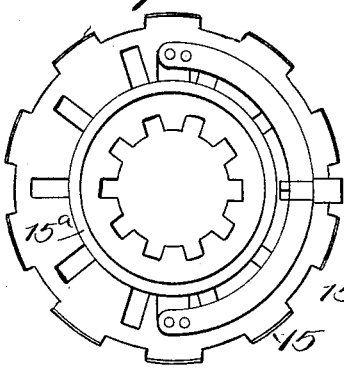
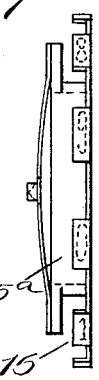
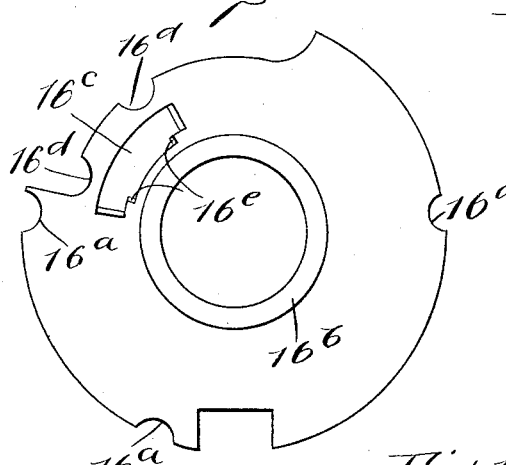
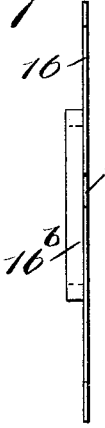
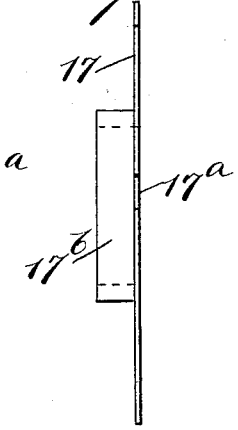
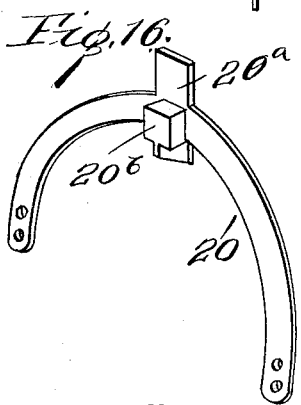
Witnesses
B G Bramm
R. S. Gehr
Inventor
Edward H. Guyer
H. H. Bliss
By
Attorney

UNITED STATES PATENT OFFICE.

EDWARD H. GUYER, OF ROCK ISLAND, ILLINOIS.

REGISTERING MECHANISM.

1,160,281. Specification of Letters Patent. Patented Nov. 16, 1915.

Original application filed May 28, 1908, Serial No. 436,310. Divided and this application filed February 11, 1909, Serial No. 477,381. Renewed April 2, 1915. Serial No. 18,838.

*To all whom it may concern:*

Be it known that I, EDWARD H. GUYER, a citizen of the United States, residing at Rock Island, in the county of Rock Island and State of Illinois, have invented certain new and useful Improvements in Registering Mechanism, of which the following is a specification, reference being had therein to the accompanying drawing.

This invention relates to registering devices such as are employed in computing machines of various kinds.

The object of the invention is to provide a dial mechanism for indicating the results of various arithmetical operations, such as addition and subtraction, which is simple and substantial in construction and, at the same time, accurate in operation.

This application is a division of my prior application, filed May 28, 1908, Ser. No. 436,310, for combined typewriting and computing machines.

In the present application I show only such parts of the machine which constitute the subject matter of said prior application as are necessary for a clear understanding of the dial mechanism *per se*.

In the complete machine there are various devices, with which the present application is not concerned, which coöperate with the dial mechanism, and for an understanding of these matters reference may be had to the said earlier application.

In the accompanying drawings, Figure 1 is a front elevation of the registering mechanism. Fig. 2 is a plan view of the same. Fig. 3 is a transverse section through the dial supporting frame. Fig. 4 is a vertical longitudinal section showing the quill bearings and clutch mechanism. Fig. 5 is a perspective view showing a portion of the quill, the stationary shaft, and the shuttle. Fig. 6 is a detail perspective of the shuttle. Fig. 7 is a detail perspective of the dial-releasing dog. Fig. 8 is a longitudinal section of the same. Fig. 9 is a face view of one of the dial supporting disks. Figs. 10 and 11 are edge views of the same; the former showing a short and the latter a long bearing collar. Fig. 12 is a face view of one of the dials. Fig. 13 is an edge view of the same. Fig. 14 is a face view of one of the dials showing a modified construction for use with the form of supporting disks shown in Fig. 11. Fig. 15 is an edge view of the same, and Fig. 16 is a perspective view of one of the carrying pawls.

The registering mechanism consists essentially of a series of dials arranged and actuated in a manner which will presently be described. These dials are supported by a frame which comprises a base 11 and upstanding end plates 12 and 13. The upper face of the base 11 is concaved to receive the lower part of the dials 14 and 15 and the dial supporting and spacing disks 16 and 17. The concaved face of the base is longitudinally grooved or recessed at $11^a$ to receive and rigidly support tubes 18 and core rods 19.

Each of the tubes 18 is formed with a series of evenly spaced transverse slots. A series of dial supporting disks 16—17 have their edges entering the tube slots and are accurately centered and rigidly supported by the core rods 19, which engages notches $16^a$—$17^a$ formed in the edges of the disks. By supporting the disks in this manner one of the disks with its dial can be removed for repair or replacement without disassembling the other dial. Each of the disks has a central, circular, aperture surrounded by a bearing collar $16^b$ or $17^b$ to support a dial.

The dials 14, like the supporting disks, are formed of sheet metal, each disk having a series of equally spaced notches in its periphery. The teeth formed by these notches are bent laterally and the outturned face of each displays a numeral, there being ten such teeth numbered 0 to 9, inclusive. Each of the dials is centrally apertured, the periphery of the aperture being notched to form a series of ten inwardly projecting teeth $14^c$ in radial alinement with the numeral-displaying faces above referred to. These teeth are designed to be engaged by dial-turning devices later to be described.

$14^a$ is a bearing collar or hub adapted to fit the outer face of the collar $16^b$ of a supporting disk 16 and to rotate freely thereon.

20 is a spring carrying pawl which consists of a half ring of flat spring metal having a centrally arranged outwardly extending projection $20^a$ and in line therewith a laterally extending tooth 20$^b$. This pawl has its ends rigidly secured, as by riveting, to the lateral face of the dial in a position such that the extension 20$^a$ is disposed centrally of the notch between the numeral faces 9 and 0. Just outside of the bearing hub 14$^a$ are a series of ten rectangular perforations 14$^b$ in radial alinement with the peripheral notches of the dial and in circumferential alinement with the tooth 20$^b$ of the carrying pawl.

When one of the dials is in working position on its supporting disk, the tooth 20$^b$ of the carrying pawl is in circumferential alinement with an arcuate slot 16$^c$ in the supporting disk. This slot is in radial alinement with what may be termed the reading position of the dials, this position being intermediate the two notches 16$^d$ formed in the periphery of the disk and serving a purpose to be referred to later.

As the dial rotates with respect to its supporting disk in the direction for addition the tooth 20$^b$ of the carrying pawl moves into the slot 16$^c$ as the numeral 9 moves from the reading position and numeral 0 comes into reading position, this lateral movement of the pawl being due to the spring action of its arms. In the case of subtraction, with the rotation in the opposite direction, the tooth 20$^b$ moves into the slot as the numeral 0 moves out of and numeral 9 moves into the reading position. As the tooth 20$^b$ moves into the slot it comes into engagement with one of the apertures 14$^b$ of the dial of the next higher denomination and carries it forward or backward, as the case may be, one point. As the tooth of the carrying pawl nears the end of the slot 16$^c$ in the carrying operation, the inwardly extended beveled projection of the tooth 20$^b$ engages one of the two beveled faces 16$^e$ and the tooth is thus lifted from the slot. The distance between the beveled surfaces 16$^e$ corresponds to 36 degrees of angular movement of the dial so that a movement of one point for the dial of next higher denomination is thus insured.

It is customary in writing numbers to separate the numerals in groups of threes as a matter of convenience in reading either by the use of commas or by spacing. The registering mechanism shown in this application was especially designed as a part of the combined typewriting and computing machine which constitutes the subject matter of my copending application referred to above, and in that machine the numerals are written in groups of threes. Accordingly the construction of every third dial and its supporting disks is slightly varied, the supporting disks 17 being provided with a bearing collar 17$^b$ wider than that of the disks 16, and the dial 15 being provided with a correspondingly wide bearing hub 15$^a$, the width of the collar being such that a dial 15 and its supporting disk 17 occupy the space of two sets of dials 14 and supporting disks 16. Diametrically opposite lugs are formed on the hub 15$^a$ to support the carrying pawl 20 in position to engage the adjacent dial supporting disk.

Referring now to the dial turning devices, 21 is a quill extending concentrically through the apertures in the series of dials and dial supporting disks and rotatably supported in suitable bearings at each end. A longitudinal slot 21$^a$ extends throughout the greater part of the length of the quill, being designed to receive a projecting part of the shuttle.

22 is a rigidly supported shaft extending through the quill 21 and provided with a rectangular groove 22$^a$ extending throughout its length. This shaft and the surrounding quill are designed to guide and turn a shuttle indicated as an entirety by 23, and comprising a body part 24 and a collar 25. The body part 24 has hooked ends 24$^a$ and a central notch 24$^b$ having a width equal to the width of the collar 25. The latter carries a laterally projecting lug 25$^a$. When the quill, solid shaft, and shuttle are assembled as is shown in Fig. 5, the body part 24 of the shuttle lies in the groove 22$^a$ of the shaft, while the collar 25 surrounds the shaft and body part 24 with the lug 25$^a$ extending outwardly through the slot 21 of the quill. The arrangement is such that the collar is free to rotate with respect to the stationary shaft, but can move longitudinally only with the body part 24 of the shuttle, because the collar engages the notch 24$^b$ of said body part. The lug 25$^a$ of the shuttle extends through the slot of the quill far enough to engage the inwardly extending teeth 14$^c$ of the dials, and by suitable rotation of the quill a dial engaged by the lug 25$^a$ may be turned any desired number of points.

The longitudinal movement of the shuttle to bring it into engagement with the different dials is effected by means of a steel band 26 attached at either end to one of the hooks 24$^a$ of the shuttle and adapted to be connected intermediate its ends to suitable actuating means, as the paper carriage of a typewriting mechanism.

27 is a pulley supporting frame in the form of a bar which extends through the base 11 and at its ends is bent at right angles, as indicated in the drawings, to form suitable bearing supports for the spindles 28 and 29, said spindles being supported preferably on adjustable pivot points.

30 is a sprocket wheel mounted on the spindle 28 and 31 is a grooved wheel similarly mounted on the spindle 29.

32 and 33 are brackets rigidly secured to the end plates 13 and 12, respectively. The free end of the bracket 33 also the rearwardly extending arm of the bracket 32 are slotted to receive upright shafts 35 which are adjustably secured in position by means of the bottom nuts 36 and upon which are rotatably mounted grooved pulleys 34, the latter being secured in place by means of the top nuts 37.

The pulley frame 27 is so disposed that the peripheries of the sprocket wheel 30 and of the grooved pulley 31 are in line with the path of the shuttle along the groove $22^a$ of shaft 22. The steel band therefore lies in this groove throughout its length and on emerging therefrom at either end passes over the sprocket wheel 30 and pulley 31. The band is perforated throughout its length at regular intervals, the pitch of the perforations being equal to the letter space of the typewriter. These perforations engage the pin-like teeth of the sprocket wheel. From this sprocket wheel, on one hand, and from the grooved pulleys 31, on the other, the band passes rearward over the grooved pulley 34 between which it is free to be engaged by actuating means such as mentioned above.

The quill 21 carries at one end a sleeve 38. The sleeve is formed with a ball race constituting part of the ball bearing 39 which supports the end of the quill. On the opposite end of the quill is mounted a sleeve 40 which is formed with a ball race constituting part of a ball bearing 41 which is mounted in one arm of the bracket 32 and supports the adjacent end of the quill. The sleeve 40 is slotted at $40^a$ and $40^b$ and the quill is formed with a spline or lug 42 which engages the slot $40^b$, whereby the quill and sleeve are held against relative rotation.

The shaft 22 is rigidly supported at its left end by the bracket 43 (see Figs. 1 and 2) and at its other end carries a sleeve 44 by which it is supported concentric with the quill. Between the end plate 13 and the bracket 32 are mounted gears for effecting the rotation, in either direction of the quill 21.

45 and 46 are annular gears concentric with the quill and mounted to turn freely on ball bearings, the gear 45 being carried by the bracket 32 while the gear 46 is carried by the end plate 13.

47 and 48 are gears mounted rigidly on a spindle 49, the gear 47 meshing with the gear 46 while the gear 48 lies adjacent but out of engagement with the gear 45. The gears 45 and 48 are arranged to be actuated by a common driving gear, not shown.

50 is a clutch which consists of a hub part, an annular rim part, and diametrically opposite arms which lie in the slots $40^a$ and $40^b$ of the quill sleeve 40. The rim of the clutch 50 is formed on either side with teeth $50^a$ and $50^b$ which are designed to engage notches $46^a$ and $45^a$ formed in the sides of the gears 46 and 45.

51 is a spindle, the inner end of which is guided and supported by the sleeve 44. The clutch 50 is secured on the spindle between a fixed and a removable collar. Suitable devices may be provided to move the spindle 51 endwise in either direction, so as to move the clutch 50 into any one of three position, viz: engagement with the gear 45; engagement with the gear 46; and an intermediate position in which it is out of engagement with both of said gears. Bearing in mind that the gears 45 and 48 are simultaneously actuated by the common driving gear (not shown), it is clear that the quill will be rotated in one of two directions accordingly as the clutch 50 is in engagement with one or the other of the gears 45 and 46. This rotation of the quill transmitted to the collar part 25 of the shuttle effects the turning of the dials in the manner previously stated.

With the dials and carrying pawls constructed as described, it is necessary to provide some means to prevent the live dial, that is, the one engaged by the shuttle, from carrying with it one or more of the dials of lower denomination, this action being possible in case the dial of next lower denomination happens to be in position with its carrying pawl in the slot $16^c$ of the interposed supporting disk.

A rock shaft 52, formed with a rectangular groove throughout its length, is mounted directly above the dials with bearing supports in the end plates 12 and 13. 53 is a pawl or dog having at its free end engaging teeth $53^a$, and at its other end formed with a boss or sleeve to slidingly engage the rock shaft 52. The teeth $53^a$ are flat on their right sides and beveled on their left sides and normally lie in the notches $16^d$ of the dial carrying disks 16. These notches $16^d$ lie adjacent the ends of the arcuate slot $16^c$ of each disk so as to laterally expose the extension $20^a$ of the adjacent carrying pawl 20, when the latter is in either of the two positions of rest which it may occupy while its tooth $20^b$ lies in the slot $16^c$.

The boss or sleeve of the dog 53 carries a rigid spline 54 which lies in the rectangular groove of the shaft 52, and which has a hooked end $54^a$ to receive one end of a perforated steel band 55.

56 is a loose hook member adapted to receive the other end of said steel band and secured to the dog 53 by means of the flanged collar 57 which is threaded upon the sleeve of the dog. The steel band 55 lies within the rectangular groove of the shaft 52 throughout the length thereof, passing at the right over a sprocket wheel 58 mounted on the upright spindle 28, thence transversely of the machine to the grooved pulley 59 carried by the spindle 29. In assembling the parts the desired tension of the steel band is obtained by adjustment of the threaded collar 57.

The dog 53 is normally pressed downward by spring 60, so as to bring its engaging teeth 53$^a$ in line with the notches 16$^d$ of the pawl-carrying disks 16. The spring 60 is mounted upon the fork 61, the latter being rotatably secured upon the sleeve of the dog between the face of the dog arm and a detachable securing nut or collar 53$^b$. The fork is prevented from turning by reason of its engagement with the sleeve 62 on the overthrow detents 63, which sleeve is slidably mounted on a rod 64 above and parallel to the shaft 52.

The overthrow detents are designed to prevent the overthrow of the dial when it is carried by the dial of next lower denomination. The detents are in the form of segments, two in number, which are pivotally mounted on the sleeve 62. The rod 64, on which this sleeve is suitably mounted, is carried by upright end plates or bars 65 which are suitably guided to have a slight up and down movement. The frame formed by these end bars and the rod 64 is adapted to be actuated, that is, raised and lowered in unison with the movement of the shuttle. The object of raising the detents is to lift them at the time the shuttle and dog 53 are moved so that they may be free to move from one set of dials to another, the detents and their carrying sleeve 62 being moved along the rod 64 by the fork 61 which engages a suitable groove in the detent sleeve. The detent segments themselves are slotted to permit the passage through them of the rock shaft 52, and at their lower ends are formed with three dial engaging teeth 63$^a$. With the dial in a normal position of rest the middle one of the teeth 63$^a$ projects between two of the numeral displaying faces of the dial in position to be engaged as the dial is turned. Such engagement causes the oscillation of the segment, thus causing one or the other of the outer teeth 63$^a$ to pass into the next adjacent notch in the dial. The movement of the dial is thus arrested, inasmuch as the oscillation of the segment is limited by engagement with the rock shaft 52.

The connection between the dog 53 and the sleeve of the overthrow detent is such that the detents are always maintained in position to engage the two dials of next higher denomination than the live dial. Two of the detent segments are necessary on account of the dials with intermediate spacers, for a single segment would be inoperative when it fell in one of these spaces. With two segments, the engagement of one of them with the dial of the next denomination is always insured. Of course, the use of a second segment might be avoided by making the width of the numeral displacing faces of the dials 16 equal to the width of the bearing hubs 15$^a$.

I have not in the present application shown the mechanism for bodily lifting the detents, as that mechanism constitutes no part of the present invention. For a detailed disclosure of this mechanism, reference may be had to my prior application hereinbefore referred to.

It is clear that the sprocket wheel 58 will move the steel band 55 and with it the dog 53 in unison with the paper carriage and the shuttle 23. The parts are assembled so that the dog 53 is always just one space to the right of the dial engaging lug 25$^a$ of the shuttle 23. Consequently as the shuttle moves into engagement with the dial next to be turned, the dog 53 moves into position above the adjacent dial of next lower denomination and one or the other of its teeth 53$^a$ at the same time engages the pawl extension 20$^a$ of the last mentioned dial in case it is in position to bring said extension in line with either of the notches 16$^c$ of the dial supporting disk. By this engagement the dog withdraws the tooth 20$^b$ of the pawl from engagement with the live dial; that is to say, the dial next to be turned. Before the dog 53 can move another step to the right, it must be lifted to disengage it from the pawl projection 20$^a$ and to this end I provide means for rocking the shaft 52 so as to lift the dog slightly at the time it is advanced, in unison with the shuttle. It is clear that the momentary lifting of the dog releases the carrying pawl which may have been engaged by one of the dog teeth and permits the dog to move in unison with the paper carriage one space to the right, engaging in such movement the pawl extension of the dial over which it moves in case such extension chances to be in the path of either of the dog teeth. I have not shown the means for effecting the rocking of shaft 52 as said means constitutes no part of the present invention.

The operation of the recording mechanism will readily be understood from the description which has been given. The steel band 26, being connected to some suitable actuating means such as previously described, the shuttle is moved successively into engagement with the internal teeth of the dials and when the shuttle is thus brought into engagement with any particular dial, the latter may be turned through any number of points by suitable actuation of the quill driving gears. When the clutch 50 engages the gear 45, the quill is turned in one direction, viz., that for addition, and when the clutch engages the gear 46 the quill is turned in the other direction, for subtraction.

When, in the operation of addition, one of the dials is turned so that its numeral 9 moves out of and the character "0" into the reading position, the dial of next higher denomination is advanced one point to effect the carrying operation in the manner previously described. Similarly, in the operation of subtraction the dial of next higher denomination than the live dial is moved back one point when the character "0" of the live dial moves out of and the numeral 9 moves into the reading position.

As the shuttle is moved from left to right, engaging one after another of the dials, the dial releasing dog 53 is moved in unison with the shuttle, in the manner previously described, so as to prevent the transmission of the movement of the live dial to any of the dials of lower denomination.

What I claim is—

1. The combination of a plurality of spaced supporting disks, having each a laterally extending bearing collar, a plurality of registering dials rotatably mounted on the disks, and means carrying the supporting disks adapted to permit the detachment of any disk independently of the others.

2. The combination of a plurality of spaced, parallel supporting disks, a plurality of registering dials rotatably mounted on the disks, said dials being made of sheet metal and each having an axially extending bearing collar to engage a supporting disk, and means carrying the supporting disks adapted to permit the detachment of any disk independently of the others.

3. The combination of a plurality of spaced, parallel supporting disks of sheet metal each of which has an axially extending bearing collar, a plurality of registering dials of sheet metal rotatably mounted on the disks, each dial having an axially extending bearing collar to engage the bearing collar of a supporting disk, and means carrying the supporting disks adapted to permit the detachment of any disk independently of the others.

In testimony whereof I affix my signature, in presence of two witnesses.

EDWARD H. GUYER.

Witnesses:
 EDWARD B. KREIS,
 M. F. KREIS.

Copies of this patent may be obtained for five cents each, by addressing the "Commissioner of Patents, Washington, D. C."